(12) United States Patent
Naden et al.

(10) Patent No.: US 8,204,504 B2
(45) Date of Patent: Jun. 19, 2012

(54) WIRELESS COMMUNICATIONS SYSTEM AND METHOD

(75) Inventors: James M Naden, Hertford (GB); Chris Ward, Bishops Stortford (GB); Andrew W Jeffries, Saffron Walden (GB)

(73) Assignee: Rockstar Bidco LLP, New York, NY (US)

( * ) Notice: Subject to any disclaimer, the term of this patent is extended or adjusted under 35 U.S.C. 154(b) by 1616 days.

(21) Appl. No.: 10/261,068

(22) Filed: Sep. 30, 2002

(65) Prior Publication Data

US 2003/0129985 A1 Jul. 10, 2003

Related U.S. Application Data

(60) Provisional application No. 60/337,547, filed on Oct. 26, 2001.

(51) Int. Cl.
*H04W 40/00* (2009.01)
(52) U.S. Cl. ......... 455/447; 455/456; 455/574; 370/330
(58) Field of Classification Search .................. 455/447, 455/446, 422.1, 444, 449, 448, 519, 453, 455/454, 518, 517, 455, 452.1, 452.2; 375/267, 375/216; 445/447; 370/320, 335, 342, 441
See application file for complete search history.

(56) References Cited

U.S. PATENT DOCUMENTS

| | | | | |
|---|---|---|---|---|
| 5,640,678 A * | 6/1997 | Ishikawa et al. | ............... | 455/449 |
| 5,818,820 A * | 10/1998 | Anderson et al. | ............. | 370/280 |
| 5,844,894 A * | 12/1998 | Dent | ............................. | 370/330 |
| 5,890,054 A * | 3/1999 | Logsdon et al. | ............. | 455/11.1 |
| 5,953,661 A * | 9/1999 | Schwinghammer et al. | . | 455/423 |
| 6,122,759 A * | 9/2000 | Ayanoglu et al. | ............... | 714/57 |
| 6,163,700 A * | 12/2000 | Hussain et al. | ............... | 455/453 |
| 6,278,723 B1 * | 8/2001 | Meihofer et al. | ............. | 375/133 |
| 6,470,177 B1 * | 10/2002 | Andersson et al. | ............. | 455/91 |
| 6,556,551 B1 * | 4/2003 | Schwartz | ...................... | 370/331 |
| 6,556,830 B1 * | 4/2003 | Lenzo | ........................... | 455/450 |
| 6,574,266 B1 * | 6/2003 | Haartsen | ....................... | 375/133 |
| 6,584,084 B1 * | 6/2003 | Barany et al. | ................. | 370/329 |
| 6,775,548 B1 * | 8/2004 | Rong et al. | .................... | 370/468 |
| 6,965,788 B1 * | 11/2005 | Barratt et al. | ................. | 455/574 |
| 2001/0027111 A1 * | 10/2001 | Motegi et al. | ................. | 455/519 |
| 2002/0027957 A1 * | 3/2002 | Paulraj et al. | ................. | 375/267 |
| 2002/0098849 A1 * | 7/2002 | Bloebaum et al. | ............ | 455/456 |
| 2002/0105932 A1 * | 8/2002 | Miya | ............................. | 370/338 |
| 2002/0168993 A1 * | 11/2002 | Choi et al. | .................... | 455/522 |
| 2002/0193146 A1 * | 12/2002 | Wallace et al. | ............... | 455/562 |

(Continued)

*Primary Examiner* — Charles Appiah
*Assistant Examiner* — Natasha Cosme
(74) *Attorney, Agent, or Firm* — Barnes & Thornburg LLP

(57) ABSTRACT

The invention is directed to a mobile communications system having improved spectral efficiency. The invention is further directed to methods and apparatus to achieve this improved spectral efficiency. In the mobile communications system communication with a plurality of mobile terminals is provided by a base station. Within the system terminals are adapted to communicate with one or more adjacent similar terminals to establish groups of terminals, called micro-cells. Each terminal within a micro-cell receives signals from the base station and then performs a first processing step on these signals. These processed signals are shared with all the other terminals within the micro-cell. Each terminal then performs a second processing step on the information it has received from all the other terminals within the micro-cell which enables it to derive a signal intended for reception by that terminal. The technique is applicable to both the uplink (user to base station) and the down link (base station to user) and also to peer to peer (user to user) communication.

18 Claims, 11 Drawing Sheets

U.S. PATENT DOCUMENTS

| | | | |
|---|---|---|---|
| 2003/0013451 A1* | 1/2003 | Walton | 455/447 |
| 2003/0017829 A1* | 1/2003 | Ching-Hsiang et al. | 455/446 |
| 2003/0050084 A1* | 3/2003 | Damnjanovic et al. | 455/522 |
| 2003/0060168 A1* | 3/2003 | Teibel | 455/69 |
| 2005/0053025 A1* | 3/2005 | Duffy et al. | 370/315 |
| 2005/0088980 A1* | 4/2005 | Olkkonen et al. | 370/255 |

\* cited by examiner

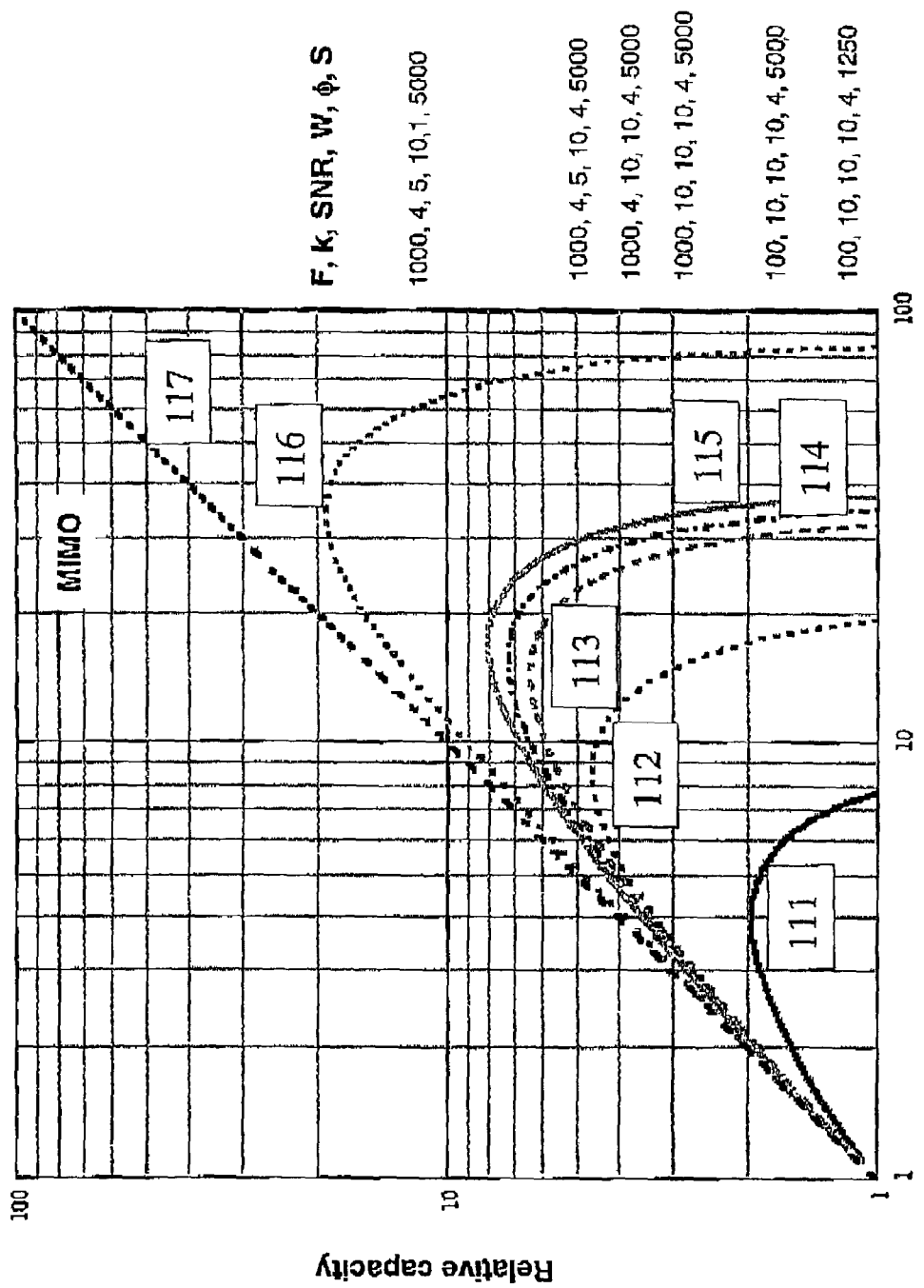

WIRELESS COMMUNICATIONS SYSTEM AND METHOD

RELATED APPLICATION

This application is the non-provisional filing of provisional U.S. patent application Ser. No. 60/337,547, filed Oct. 26, 2001.

FIELD OF THE INVENTION

This invention relates to methods and apparatus for improving the spectral efficiency of mobile cellular communications systems. The invention also relates to a mobile communications system having such improved spectral efficiency.

BACKGROUND TO THE INVENTION

Mobile cellular operators are placing increasing demands on capacity in order to support greater numbers of subscribers and higher bit-rate services. This in turn is placing increasing pressure on the restricted amount of available radio spectrum. In attempts to provide more efficient use of the available spectrum, workers in this field have considered the use of spatial processing and of the provision of micro-cells.

Spatial processing exploits the multi-path characteristics of the mobile radio channel by means of multiple antennas at the transmitter and at the receiver. The benefit arises in two ways. Firstly, there is a diversity gain, which arises provided the antennas at the receiver are sufficiently far apart for the signals they receive to be uncorrelated. Then, the signal received at any one antenna varies independently of the signals received by the other antennas and the signal-to-noise ratio of the combined signal is improved as a consequence. Secondly, the multi-path channel can be separated into independent spatial modes, each of which is capable of supporting traffic in its own right. To exploit this effect requires coding of the signal at the transmitter and multiple transmit antennas. The combination of these two effects, diversity gain and independent spatial modes, leads to an improvement in spectral efficiency that is proportional to the product of the number of transmit antennas and the number of receive antennas. Use of either of these effects alone may still provide a useful improvement, albeit smaller than that realised in combination. The improvement in spectral efficiency is only realised if the antennas are sufficiently far apart for the received signals to be uncorrelated. In practice this means that the antennas must be separated by at least one half wavelength at the frequency of the radio signal, thus restricting the application of spatial processing to higher frequencies and or larger antenna installations. Recent work has sought to overcome this restriction by suggesting that the antennas need not be placed on the same terminal, either at the transmitter or at the receiver, and that groups of terminals can cooperate to form virtual transmit and receive antenna arrays.

Micro-cells are an extension of the cellular concept to smaller cells in an attempt to accommodate larger numbers of users. In cellular radio, the radio spectrum that is used in one geographical area, or cell, may be re-used in other cells, provided that the cells are sufficiently far apart for mutual interference to be below a pre-determined level. The level of interference is dependent on the ratio of the cell diameter and the distance between cells in such a way that it remains constant if both are changed in proportion, for example if both are halved. Hence higher capacity density can be achieved by means of smaller cells. The small cells typical of micro-cellular architectures therefore offer the potential for very high capacity density and hence high overall spectral efficiency. However, such architectures, while offering high capacity density within the cells, pose the difficult backhaul problem of linking the myriad cells back into the network. There is also the requirement for an added layer of wireless infrastructure. The use of micro-cells has therefore been usually restricted to areas where an optical fibre infrastructure is readily accessible, such as in-building.

OBJECT TO THE INVENTION

The invention seeks to provide a wireless communications system and method which mitigates at least one of the problems of known methods.

SUMMARY OF THE INVENTION

According to a first aspect of the invention there is provided a mobile communications system in which communication with a plurality of mobile terminals is provided by a base station, wherein said terminals are adapted each to communicate with one or more adjacent similar terminals to establish disjoint groups of terminals, each said group functioning co-operatively as a micro-cell for communications purposes, wherein each terminal in a said group is arranged to perform a first processing step on signals received from the base station, to exchange with the other terminals of the group information derived from said first processing step, and to perform a second processing step utilising exchanged information received from other terminals of the group so as to derive, from the received signals, a signal intended for reception by that terminal.

The number of terminals within a group is such that the spectral efficiency of the system is maximised.

Preferably, the amount of processing that is performed in the first processing step is controlled so as to enhance the spectral efficiency gain.

The base station may be arranged to transmit simultaneously a plurality of signals one for each mobile terminal of the group.

Each said transmitted signal may be encoded with a respective unique spreading sequence, and said spreading sequence may comprise a Walsh code.

The system may comprise a code division multiple access (CDMA) system.

The terminals may be selected to form part of said group by monitoring the strength of a received signal from the base station and selecting terminals with the highest received signal strength.

According to another aspect of the invention there is provided a mobile communications system in which a plurality of mobile terminals communicate with one another in a peer to peer manner, wherein said terminals are adapted each to communicate with one or more adjacent similar terminals to establish groups of terminals, each said group functioning co-operatively as a micro-cell for communications purposes, wherein each terminal in a said group is arranged to perform a first processing step on signals received from outside the group, to exchange with the other terminals of the group information derived from said first processing step, and to perform a second processing step utilising exchanged information received from other terminals of the group so as to derive, from the received signals, a signal intended for reception by that terminal.

Advantageously, spectrum is reserved for intra-group communication so as to enhance spectral efficiency.

In a preferred arrangement, the groups of mobile terminals are formed on an ad-hoc basis and comprise a number of terminals such that the number of terminal antennas being serviced by the base station is as close as possible to a predetermined optimum number. Each base station antenna transmits to all terminals of the group a respective signal intended for reception by one terminal of that group. Each terminal processes the received signals to determine channel estimates which are then used in a matched filter to reduce channel distortion prior to the correlation process. This information is shared by the terminals to facilitate recovery of the signals intended for each terminal of the group.

Advantageously, each signal transmitted by the base station is encoded with a respective unique spreading sequence, e.g. a Walsh code. Pilot sequences may be added to the transmitted signals to facilitate channel estimation.

According to another aspect of the invention there is provided a method of providing spectrum re-use in a mobile communications system in which communication with a plurality of mobile terminals is provided by a base station, and wherein said terminals are adapted each to communicate with one or more adjacent similar terminals to establish groups of terminals, each said group functioning co-operatively as a micro-cell for communications purposes, the method comprising: transmitting signals from the base station to all terminals of the group; at each terminal of said group, performing a first processing step on signals received from the base station; exchanging with the other terminals of the group information derived from said first processing step, and performing a second processing step utilising exchanged information received from other terminals of the group so as to derive, from the received signals, a signal intended for reception by that terminal, and wherein the number of terminals within a said group is selected such as to maximise the spectral efficiency of the system.

Preferably, the amount of processing that is performed in the first processing step is controlled so as to enhance the spectral efficiency gain.

Preferably, the base station transmits simultaneously a plurality of signals one for each mobile terminal of the group.

Each said transmitted signal may be encoded with a respective unique spreading sequence and each said spreading sequence may comprise a Walsh code.

The system may comprise a code division multiple access (CDMA) system.

The terminals may be selected to form part of said group by monitoring the strength of a received signal from the base station and selecting terminals with the highest received signal strength.

According to another aspect of the invention there is provided a method of providing spectrum re-use in a mobile communications system in which a plurality of mobile terminals communicate with one another in a peer to peer manner, and wherein said terminals are adapted each to communicate with one or more adjacent similar terminals to establish groups of terminals, each said group functioning co-operatively as a micro-cell for communications purposes, the method comprising: receiving signals at all terminals of the group; at each terminal of said group, performing a first processing step on the received signals; exchanging with the other terminals of the group information derived from said first processing step, and performing a second processing step utilising exchanged information received from other terminals of the group so as to derive, from the received signals, a signal intended for reception by that terminal, and wherein the number of terminals within a said group is selected such as to maximise the spectral efficiency of the system.

The method may be performed by software in machine readable form on a storage medium.

According to another aspect of the invention there is provided a mobile terminal for use in a mobile communications system in which communication with a plurality of similar mobile terminals is provided by a base station, wherein said terminal is adapted to communicate with one or more adjacent similar terminals to establish a group of terminals functioning co-operatively as a micro-cell for communications purposes, and wherein said terminal is arranged to perform a first processing step on signals received from the base station, to exchange with the other terminals of the group information derived from said first processing step, and to perform a second processing step utilising exchanged information received from other terminals of the group so as to derive, from the received signals, a signal intended for reception by that terminal.

The mobile terminal may select which adjacent similar terminals will co-operate as a micro-cell by receiving signals from adjacent terminals, wherein each terminal monitors the strength of the signal it receives from the base station, and selecting terminals with the highest received signal strength.

According to another aspect of the invention there is provided a mobile terminal for use in a mobile communications system in which a plurality of mobile terminals communicate with one another in a peer to peer manner, wherein said terminal is adapted to communicate with one or more adjacent similar terminals to establish a group of terminals functioning co-operatively as a micro-cell for communications purposes, and wherein said terminal is arranged to perform a first processing step on received signals, to exchange with the other terminals of the group information derived from said first processing step, and to perform a second processing step utilising exchanged information received from other terminals of the group so as to derive, from the received signals, a signal intended for reception by that terminal.

According to another aspect of the invention there is provided a method of forming a micro-cell in a mobile communications system, said micro-cell comprising at least two mobile terminals adapted to communicate with one another in a peer to peer manner, the method comprising: receiving signals at a terminal from a plurality of adjacent similar terminals; each said terminal monitoring the strength of a signal received from the base station and selecting terminals with the highest received signal strength to operate within said micro-cell.

In our technique we exploit the advantages of space-time processing and micro-cells in such a way as to overcome the disadvantages of both, thus providing enhanced spectral efficiency in such a way that it is accessible with small terminals and low frequencies. The technique is applicable to both the uplink (user to base station) and the down link (base station to user) and also to peer to peer (user to user) communication.

The preferred features may be combined as appropriate, as would be apparent to a skilled person, and may be combined with any of the aspects of the invention.

BRIEF DESCRIPTION OF THE DRAWINGS

An embodiment of the invention will now be described with reference to the accompanying drawings in which:

FIG. 11 illustrates graphically a sixth example of the form of the spectral efficiency improvement that may be obtained by the system of FIG. 1.

DETAILED DESCRIPTION OF INVENTION

The application of our technique in a mobile cellular radio environment is shown diagrammatically in FIG. 1 and consists of a macro-cellular architecture overlaid on a pseudo micro-cellular architecture as will be described below.

Figure 1:
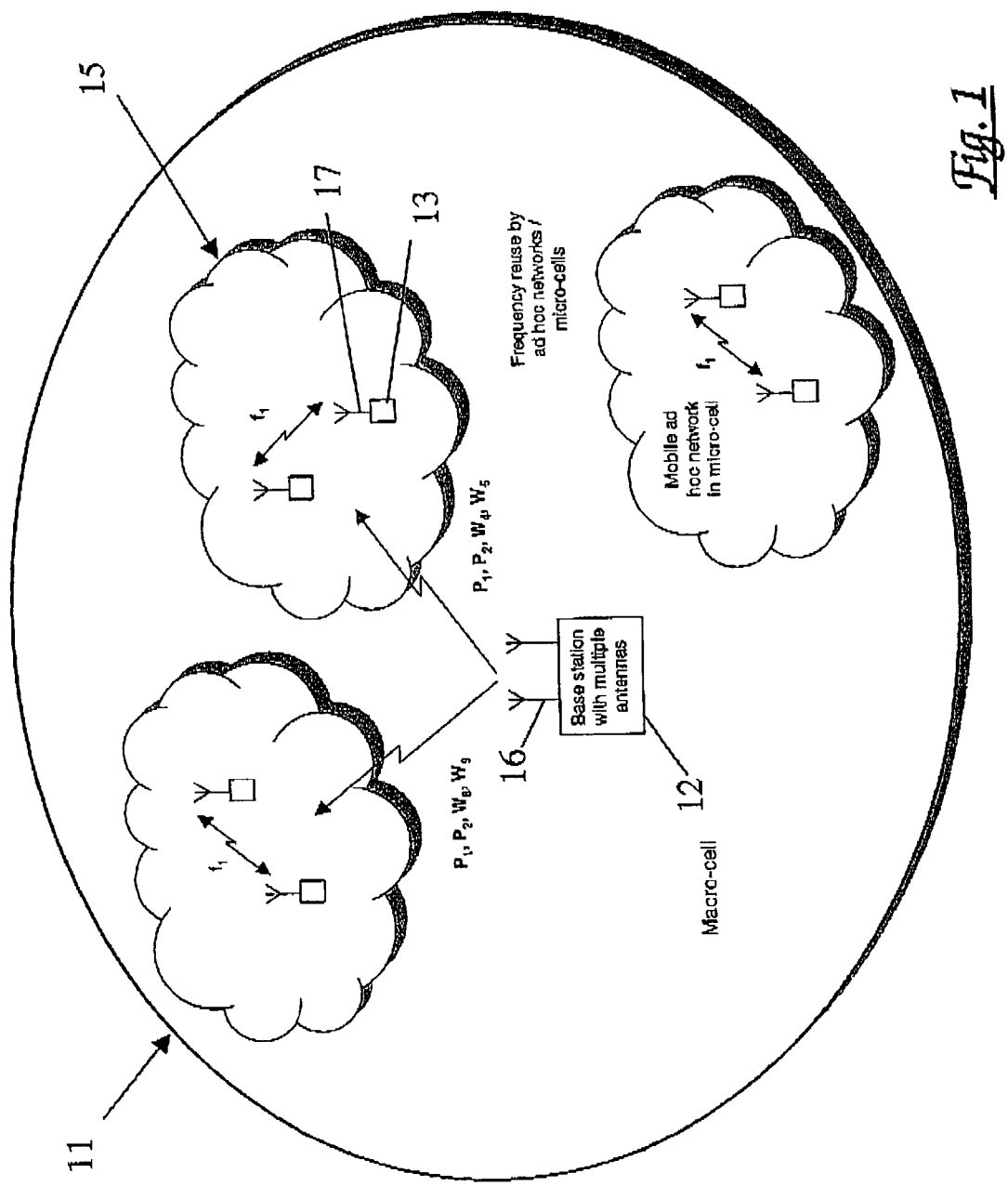
FIG. 1 is a schematic diagram of part of a mobile communications system according to a preferred embodiment of the invention.

The cellular architecture shown in FIG. 1 will typically comprise a CDMA (Code Division Multiple Access) system using spatial processing. Although this is our preferred embodiment, it will be apparent to those skilled in the art that the methods described below are also applicable to other multiple access techniques such as TDMA (Time Division Multiple Access).

As indicated in FIG. 1, each macro-cell 11 is centred on a base station 12. The base station is provisioned with multiple antennas 16, although it is also envisaged that a group of base stations, each equipped with a single antenna, could cooperate to similar effect. Spatial processing is employed within the macro-cell 11, providing spectrally efficient links between the terminals in individual pseudo micro-cells or groups 15 and the base station, at which point access to the fixed network (not shown) is provided. Consequently there is no need for a fixed infrastructure to link the micro-cells to the network.

The user terminals 13 are assumed to be mobile. Each user terminal is provisioned with an antenna 17 or communication with the base station 12, although it is straightforward to generalise this concept to include user terminals with more than one antenna. To obtain the gain from spatial processing, which requires multiple antennas, each user terminal 13 cooperates with a number of other conveniently located user terminals in its vicinity by forming an ad-hoc network comprising a pseudo micro-cell. These groupings constitute the pseudo micro-cells or terminal groups 15 of the architecture shown in FIG. 1 and change on an ad-hoc basis as user terminals move within the macro cell 11 or to and from adjacent macro cells (not shown). Thus, as the user terminals roam, existing groups are dissolved and new groups are formed. The determination of a preferred number of terminals to form a group will be discussed below. Intra-group communications (also called intra-micro-cell or intra-cell or inter-terminal communications because it is between terminals in a group) are carried within a reserved spectrum $f_1$, this spectrum being allocated for use by all ad-hoc groups of terminals within the macro-cell 11 and within all other macro-cells of the system. Not all of the reserved spectrum $f_1$ need necessarily be used within every micro-cell but all intra-group (or inter-terminal) communication will occur within this reserved spectrum.

As the antennas 17 forming the link with the base station 12 are on separate user terminals, there is a low correlation between their respective signals, even at low frequencies, and there is no constraint on user terminal size caused by the need to keep adjacent antennas at least half a wavelength apart. Furthermore, the reduced number of antennas on a user terminal and the lower number of RF receive chains required as a consequence results in considerable savings in user terminal cost and complexity.

It will be appreciated that, in an alternative environment where direct peer to peer communication is the dominant mode of operation, a central base-station does not normally exist, although a larger platform, such as a vehicle, may behave similarly. Alternatively, both ends of the link may terminate on ad-hoc networks in pseudo micro-cells.

Within the pseudo micro-cell or terminal group 15, the frequencies or CDMA codes utilised are selected from a different group from those used between the base station and the user terminals, or between user terminal groups in peer to peer communications, and conform to a different frequency re-use pattern. The re-use pattern used by the pseudo micro-cells is independent of that used by the macro-cells. Thus any spectrum used in the micro-cells can be re-used in the micro-cells of every macro-cell, irrespective of the macro-cell re-use factor.

The terminals 13 exchange the necessary information within their own pseudo micro-cell or group to decode the space-time signals from the base station and to encode the space-time signals for the base station. This exchange of information within the terminal group 15 may occur as part of an integrated protocol for the entire system or alternatively may make use of an existing protocol, such as a wireless local area network, for example IEEE 802.11. Protocols supporting ad-hoc networking are particularly suitable, for example Bluetooth. The amount of information to be exchanged is relatively high and without the frequency re-use afforded by the micro-cells would more than offset the gain provided by the spatial processing. Including this frequency re-use, however, gives rise to a net gain in the spectral efficiency of the total system compared to that of the macro-cell alone.

The way in which the information is exchanged in the system of FIG. 1 influences the overall spectral efficiency significantly. For simplicity of explanation, the information exchange process is described below with reference to FIG. 2 for a base station having two antennas communicating with two user terminals, but it will be appreciated that the concept can be readily extended to systems with additional base station antennas and larger groups of user terminals or to systems in which both ends of the link terminate on a group of user terminals in a pseudo micro-cell.

Figure 2:
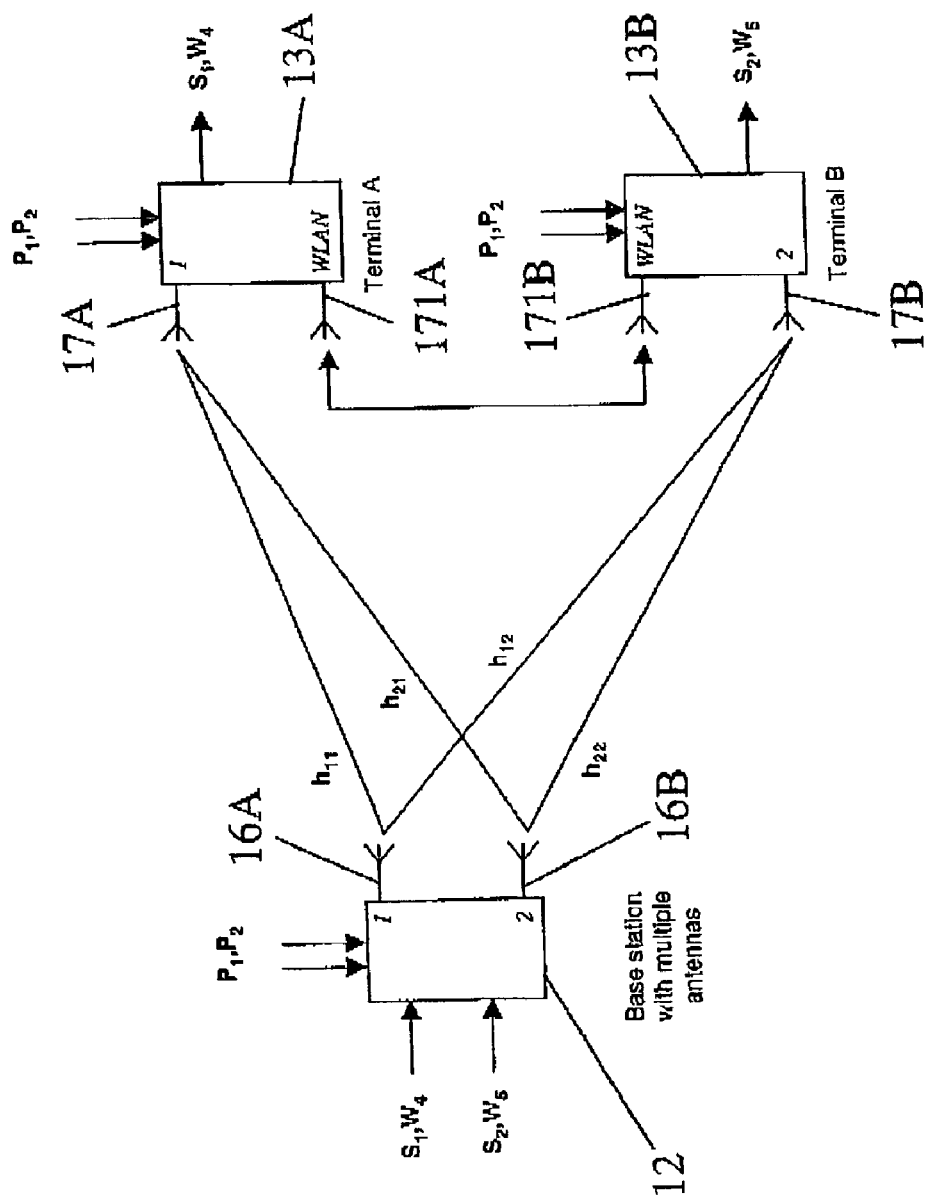
FIG. 2 illustrates in simplified schematic form the communication process between a base station and a group of mobile terminals in the system of FIG. 1.

In FIG. 2, each terminal 13A, 13B is shown as having a primary antenna 17A, 17B for communication with the base station and a secondary antenna 171A, 171B for communication with other terminals of the group. This secondary antenna may be a discrete component as shown in FIG. 2, or it may be incorporated in the main antenna. Thus, the main antenna may have a dual role.

As shown in FIG. 2, signal $S_1$ is transmitted from the base station 12 to user terminal 13A and signal $S_2$ is transmitted from the base station 12 to user terminal 13B. Signal $S_1$ is encoded with a first unique spreading sequence $W_4$, e.g. a Walsh code, and comprises a sequence of space-time symbols which are transmitted from the base station 12 via antennas 16A and 16B. Similarly, signal $S_2$ is encoded with a second unique spreading sequence $W_5$ and is also transmitted from the base station 12 via antennas 16A and 16B as a sequence of space-time symbols. In addition, a first pilot sequence $P_1$ is transmitted from antenna 16A of the base station and a second pilot sequence $P_2$ is transmitted from antenna 16B of the base station. These transmissions from the base station 12 are within the spectrum allocated to the macro-cell. Within the ad-hoc terminal group or micro-cell, all of the transmissions from the base station 12 are received by both user terminal 13A via antenna 17A and user terminal 13B via antenna 17B.

The radio channel between base station antenna 16A and antenna 17A on user terminal 13A is denoted in FIG. 2 as $h_{11}$. Similarly, the radio channel between base station antenna 16A and antenna 17B on user terminal 13B is denoted in FIG. 2 as $h_{12}$, the radio channel between base station antenna 16B and antenna 17A on user terminal 13A is denoted in FIG. 2 as $h_{21}$, and the radio channel between base station antenna 16B and antenna 178 on user terminal 13B is denoted in FIG. 2 as $h_{22}$.

In order to extract the signal $S_1$ from the received signals, user terminal 13A requires knowledge of the signals received by user terminal 13B and of the channels $h_{11}$, and $h_{21}$. Similarly, in order to extract the signal $S_2$ from the received signals, user terminal 13B requires knowledge of the signals received by user terminal 13A and of the channels $h_{12}$ and $h_{22}$.

Figure 3:
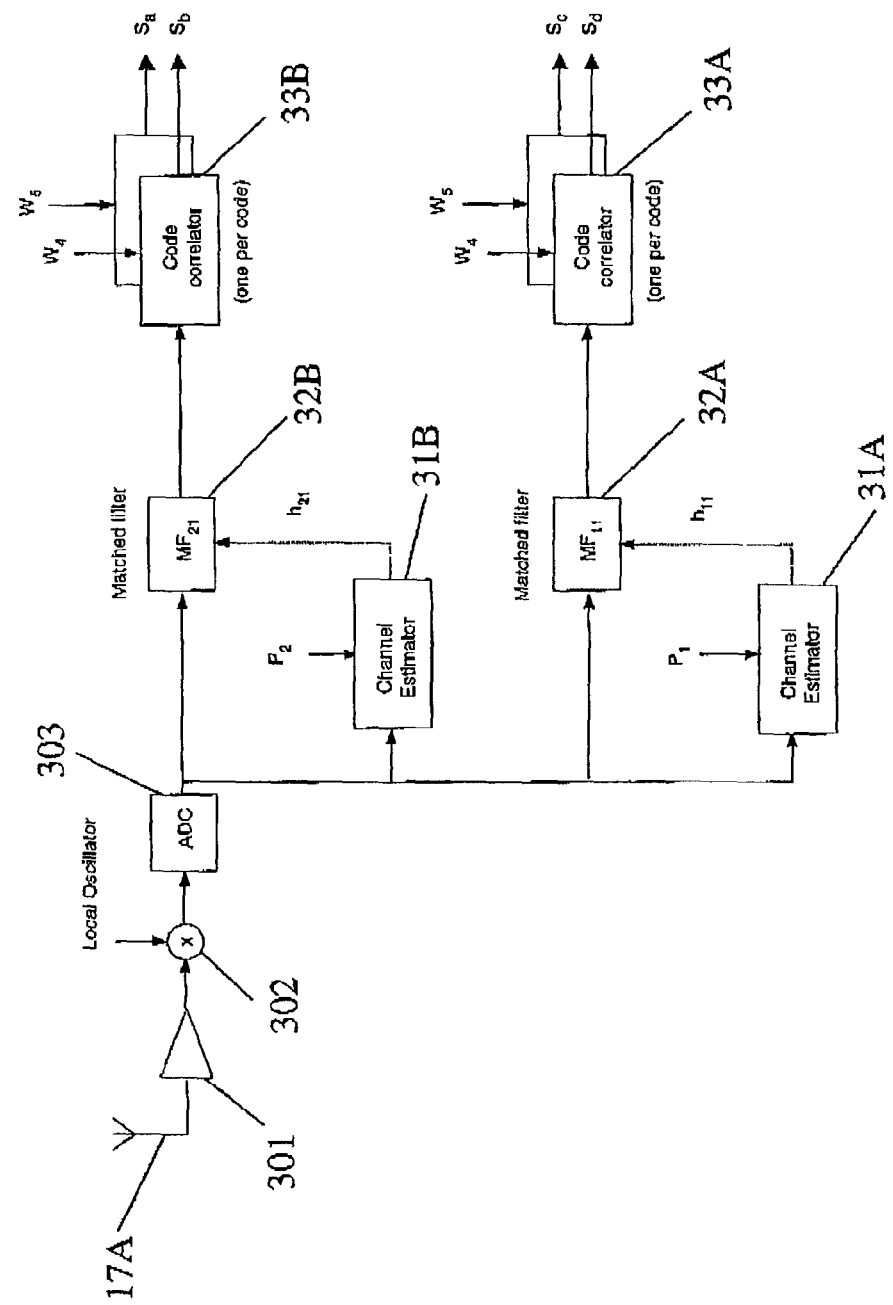
FIG. 3 illustrates the process of signal reception and a first stage of signal processing in one of the user terminals of the group of mobile terminals of FIG. 2.

This information is obtained in a digital implementation of a COMA system by the method illustrated in FIG. 3. As can be seen from FIG. 3, the digitised base-band signal in user terminal 13A is passed via an input stage or front end shown schematically as comprising amplifier 301, frequency converter 302 and analogue to digital converter (ADC) 303 to a bank of channel estimators 31A, 31B, one for each base station transmit antenna 16A, 16B. Again, for simplicity only two channel estimators are shown although it will of course be appreciated that a larger number of base station antennas and channel estimators may be provided. The first channel estimator 31A estimates the channel $h_{11}$, from base station antenna 16A (FIG. 2) to antenna 17A on user terminal 13A using the known pilot sequence $P_1$. This first channel estimate is used to form the matched filter 32A for channel $h_{11}$ through which the signal is then passed. Similarly, the second channel estimator 31B estimates the channel $h_{21}$ from base station antenna 16B (FIG. 2) to antenna 17A on user terminal 13A using the known pilot sequence $P_2$. This second channel estimate is used to form the matched filter 32B for channel $h_{21}$ through which the signal is then passed. The filtered signals are then passed to respective parallel banks of code correlators 33A, 33B. Each bank of code correlators has one correlator for each of the unique spreading sequences $W_4$ and $W_5$. The correlators split the signal according to the unique spreading sequence and remove the unique spreading sequences.

An analogous process takes place in terminal 13B and any other member of the terminal group. The digitised base-band signal in user terminal 13B is similarly passed to a bank of channel estimators, one for each base station transmit antenna. The first channel estimator estimates the channel $h_{12}$ from base station antenna 16A to antenna 17B on user terminal 13B using the known pilot sequence $P_1$. This channel estimate is used to form the matched filter for channel $h_{12}$ through which the signal is then passed. Similarly, the second channel estimator estimates the channel $h_{22}$ from base station antenna 16E to antenna 17B on user terminal 13B using the known pilot sequence $P_2$. This channel estimate is used to form the matched filter for channel $h_{22}$ through which the signal is then passed. The filtered signals are then passed to parallel banks of code correlators. Each bank of code correlators has one correlator for reach of the unique spreading sequences $W_4$ and $W_5$. The correlators split the signal according to the unique spreading sequence and remove the unique spreading sequences.

At this stage the intermediate signals $s_a$, $s_b$, $s_c$, $s_d$ output from the code correlators are still in soft form: that is, each intermediate signal is a digital representation of an analogue signal rather than a digital binary signal.

Having determined the signal estimates, user terminals 13A and 13B then exchange their signal estimates so that both terminals now have all available information concerning the transmitted signals $S_1$ and $S_2$. The extent to which the signals are processed prior to being transmitted to the other user terminals in the group is chosen so that the amount of information to be exchanged is minimised consistent with minimising the probability of error in the final output following further processing of the signals as will be described below.

The necessary information is exchanged between the user terminals using the antennas 171A and 171B (denoted WLAN) in FIG. 2. These antennas are shown separately for clarity. However, as discussed above, separate antennas are not essential and antenna 17A on user terminal 13A and antenna 17B on user terminal 13B may be used instead. Transmissions between the terminals are within the spectrum $f_1$ allocated to the pseudo micro-cell. Intra-micro-cell communication within the pseudo micro-cell may be digital or analogue.

Figure 4:
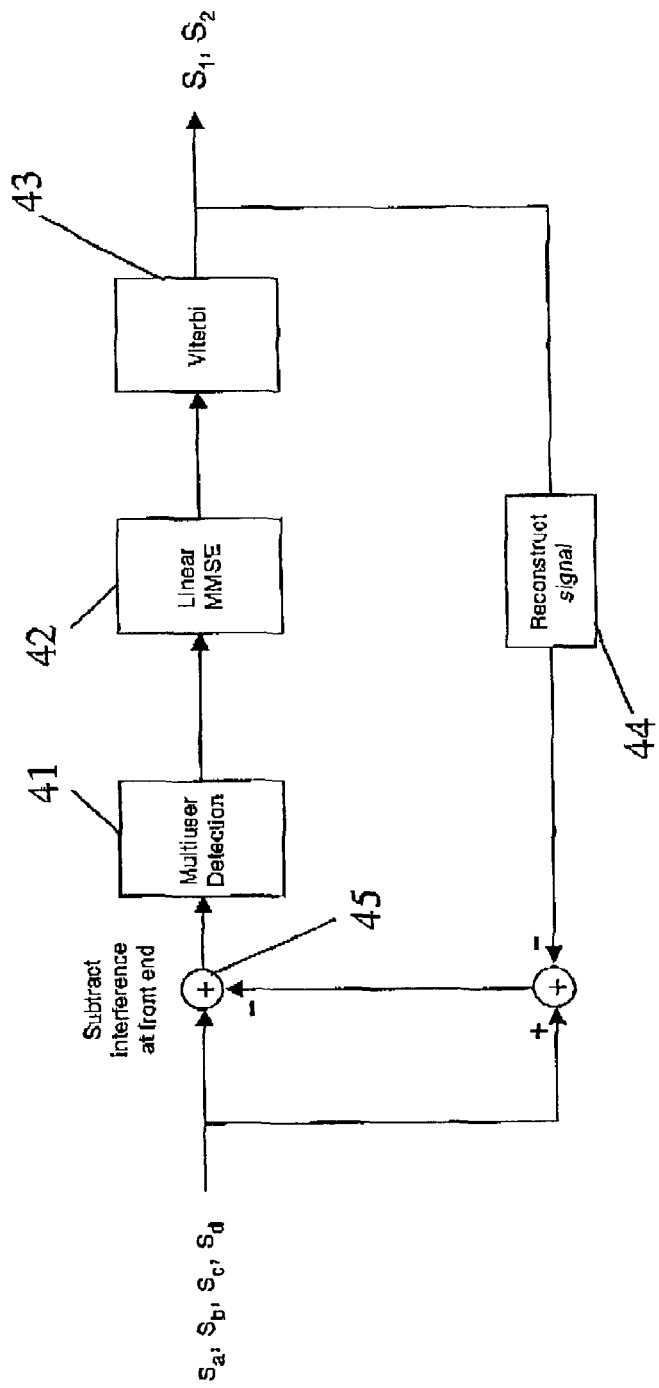
FIG. 4 illustrates a second stage of signal processing in one of the user terminals of the group of mobile terminals of FIG. 2.

Having obtained the information from the other user terminals in the group, namely user terminal 13B in this example, user terminal 13A is now able to perform further processing of the intermediate signals $s_a$, $s_b$, $s_c$, $s_d$. A preferred embodiment of this further processing is shown in FIG. 4. The initial stage employs a multi-user detection algorithm 41 which reduces the residual mutual interference between signals from different sources or intended for different terminals that has not been removed by the correlators. Demodulation of the signals is then performed using a combination of linear MMSE 42 and Viterbi 43 sequence estimators. Having estimated the signals $S_1$ and $S_2$ the corresponding intermediate signals are then reconstructed 44 as they would appear at the input and, by comparison with the actual intermediate signals, any residual interference is estimated. Subtracting this interference from the input 45 and recalculating the signals $S_1$ and $S_2$ then improves the error performance.

Analogous processing also takes place in user terminal 13B. In a similar manner, the initial stage of terminal 13B employs the multi-user detection algorithm which reduces the residual mutual interference between signals from different sources or intended for different terminals that has not been removed by the correlators. Demodulation of the signals is then performed by sequence estimation using a combination of linear and Viterbi sequence estimators. Having estimated the signals $S_1$ and $S_2$, the corresponding intermediate signals are then reconstructed as they would appear at the input and, by comparison with the actual intermediate signals, the interference is estimated. Subtracting this interference from the input and recalculating the signals $S_1$ and $S_2$ then improves the error performance.

It will be apparent that both signals $S_1$ and $S_2$ are available in both user terminal 132A and user terminal 13B. Consequently, where allowed for in a higher layer protocol, such as ATM or TCP/IP, statistical multiplexing gain may be realised in addition to the spatial processing gain previously described. Statistical multiplexing gain arises because neither user terminal is restricted to the capacity provided by $S_1$ or $S_2$ but may, at any one instant, make use of a capacity up to that of the combined capacity of the user terminals in the group, provided it is not being used by other user terminals. This is particularly advantageous where variable rate traffic is predominant and the instantaneous capacity demanded by a terminal fluctuates.

Figure 5:
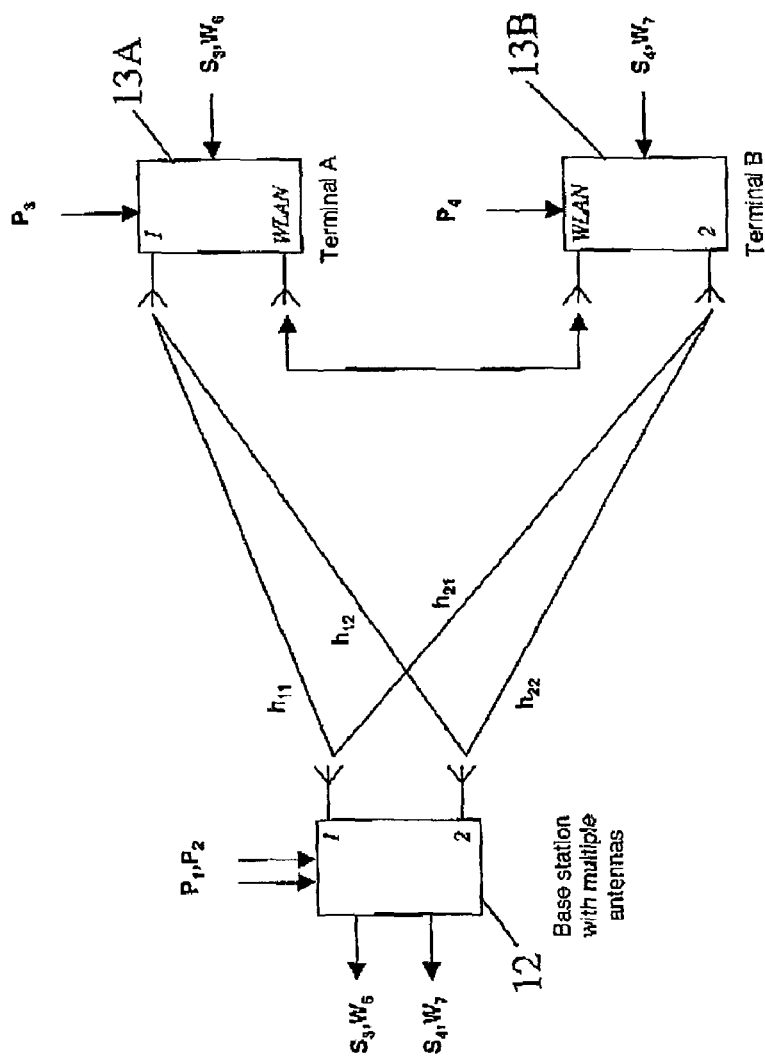
FIG. 5 illustrates the process of signal transmission from the group of mobile terminals of FIG. 2.

A further embodiment of the invention is illustrated in FIG. 5 which shows an alternative communication protocol between the terminals and the base station. In the uplink direction, from user terminal 13A, 13B to base station 12, or in peer to peer communication where the transmitter is also a user terminal in a pseudo micro-cell, the transmission process is slightly modified from that described above with reference to FIG. 2 for a base station with multiple antennas. As shown in FIG. 5, signal $S_3$ is transmitted from user terminal 13A to the base station 12, and signal $S_4$ is transmitted from user terminal 13B to the base station 12. Signal $S_3$ and signal $S_4$ each comprise of a sequence of space-time symbols. These signals are exchanged between user terminal 13A and user terminal 13B so that both terminals have knowledge of both signals. The necessary information is exchanged between the user terminals using the antennas 171A, 171B (denoted WLAN in FIG. 5). Although these antennas 171A and 171B are shown separately for clarity; it will be understood from the description with reference to FIG. 2 above that separate antennas are not essential. Transmissions between the terminals 13A and 13B are within the spectrum allocated to the pseudo micro-cell. By exchanging the signals prior to introducing the spreading sequences, the amount of data to be exchanged is minimised. Signal $S_3$ is encoded with a first unique spreading sequence $W_6$, e.g. a Walsh code, and is transmitted to the base station via antenna 17A of user terminal 13A and antenna 17B of user terminal 13B. Similarly, signal $S_4$ is encoded with a second unique spreading sequence $W_7$ and is also transmitted to the base station via antenna 17A of user terminal 13A and antenna 17B of user terminal 13B. In addition, a first pilot sequence $P_3$ is transmitted from antenna 17A of user terminal 13A and a second pilot sequence $P_4$ is transmitted from antenna 17B of user terminal 17B.

The benefit in terms of improved spectral efficiency can be estimated mathematically as follows.

Let us assume that the total available spectrum is S and that the spectrum allocated to the micro-cells is $\phi\omega$, where $\omega$ is the total spectrum available for intra-communication within the group of cooperating terminals, that is within a single micro-cell, and $\phi$ is the re-use factor applying to this frequency. If the macro-cellular frequency re-use factor is $\rho$ then the spectrum available in each macro-cell is $(S-\phi\omega)/\rho$. In a conventional system not employing this method, the spectrum available in each macro-cell is simply $S/\rho$. The spectral efficiency improvement is therefore given by $$\xi = \left(1 - \frac{\phi\omega}{S}\right) \cdot G_{sp} G_{sm} \qquad \text{Equation 1}$$

where $G_{sp}$ is the spatial processing gain and $G_{sm}$ is the statistical multiplexing gain.

The value of $G_{sp}$ will depend upon the characteristics of the radio channel and on the numbers of antennas at the receiver and at the transmitter. Consider, for example, a symmetric system in which m, the number of transmit antennas, is equal to n, the number of receive antennas. It is well known in the literature that $G_{sp}$ is approximately equal to m in such a symmetric system. In the case where the traffic is constant bit rate, such that $G_{sm}$ is unity, the spectral efficiency improvement is then given by $$\xi = \left(1 - \frac{\phi\omega}{S}\right) \cdot m \qquad \text{Equation 2}$$

We make use of Shannon's capacity formula to estimate the corresponding capacity $C_{m,n}$ that can be supported in a given channel bandwidth W at a given signal to noise ratio $SNR_{1,1}$, as follows:

$$C_{m,n} = mW\left(1 - \frac{\omega\phi}{S}\right) \cdot \log_2\left(1 + n \cdot \frac{SNR_{1,1}}{m}\right) \qquad \text{Equation 3}$$

In equation 3 we have again assumed that $G_{sm}$ is equal to one, and the reduction in effective channel bandwidth is accounted for by the term $(1-\omega\phi/S)$.

It then remains to determine the proportion of spectrum that must be set aside for intra-cell communication, that is between cooperating mobile terminals in a micro-cell. This will depend upon whether analogue or digital means are employed for intra-cell communication, whether it is the transmitter or the receiver or both that is distributed in the micro-cell, whether it is a downlink or an uplink, and whether the cooperating terminals are themselves also actively engaged in their own sessions or are otherwise idle.

A single example is included here and is the case corresponding to the downlink, in which a base station with multiple antennas is transmitting to a first mobile terminal, which is in a micro-cell with other similar terminals. The other terminals in the micro-cell are assumed to be similarly engaged in their own sessions, in addition to the signals required to be received and transmitted in respect of the first mobile terminal. Intra-cell communication is assumed to be digital A number of different examples are included in appendix 1 and FIGS. 7-11.

In the downlink example described above the receiver is distributed, such that several terminals, each equipped with a single antenna, cooperate to enhance the signal received from a multi-antenna base station. In this scenario, some spectrum is required for communication between the cooperating terminals. Let the transmitter of the base station be denoted transmitter T and have m transmit antennas and the first mobile terminal be denoted receiver R and have a single receiver antenna. Let there be n terminals forming the micro-cell, including receiver R.

For each bit of a signal from transmitter T to receiver R, 1/m space-time symbols are transmitted. At each of the n receivers in the cooperating group, these space-time symbols must each be resolved to a depth of $\log_2(k.SNR)$ bits, where k is a constant greater than unity, if quantisation noise is to be small in relation to other noise in the system. Each receiving antenna, with the exception of that on receiver $R_1$ for which the signal is ultimately intended, must transmit its version of the received signal to receiver R. The total number of bits that must be transmitted by the (n−1) receivers to receiver R is therefore $$\frac{n-1}{m} \cdot \log_2(k \cdot SNR_{1,1}) \cdot C_{m,n} \qquad \text{Equation 4}$$

Similarly, each receiver must make an estimate of each of the m channels between its antenna and the m transmitting antennas. These channel estimates must be to a resolution comparable with that of the signal: $\log_2(k.SNR)$ bits. Each of the receiving antennas, other than receiver R, must pass this information to receiver R. However, because the channels change more slowly than the bit rate of the signal, channel update information need only be transmitted once per frame; let the frame size be F bits. Furthermore, the channel information is common to all of the n signals transmitted by the transmitter to the n terminals in the cooperating group, so only a fraction 1/n of the channel update information need be allocated to each signal.

Note: it is an assumption that the receiver R cooperates with other terminals engaged in their own sessions and not with idle terminals. If the latter is the case, then the factor 1/n does not apply and this term is proportionately larger. Such a situation is described in Appendix 1.

Hence, the proportion of the channel update information transmitted by the (n1) receiving antennas to receiver R corresponding to the signal intended for receiver R is $$\frac{(n-1)}{n} \cdot \frac{m}{F} \cdot \log_2(k \cdot SNR_{1,1}) \cdot C_{m,n} \qquad \text{Equation 5}$$

Combining this with the signal information and setting m=n we obtain the proportion of the total information that must be transmitted between the receiving terminals corresponding to the signal intended for receiver R.

$$\left(\frac{1}{m} + \frac{1}{F}\right)(m-1) \cdot \log_2(k \cdot SNR_{1,1}) \cdot C_{m,n} \qquad \text{Equation 6}$$

We again make use of Shannon capacity formula and solve for the ratio ωφ/S as follows:

$$\left(\frac{1}{m} + \frac{1}{F}\right)(m-1) \cdot \log_2(k \cdot SNR_{1,1}) \cdot C_{m,n} = \frac{\omega}{m} \cdot \log_2(1 + SNR_{1,1}) \qquad \text{Equation 7}$$

Note the factor 1/m on the RHS of equation 7, which arises because ω represents the total available spectrum for intra-communication within the group for all n signals destined for the group. Recalling that we have set m=n, the proportion required for the signal intended for receiver R is therefore ω/m.

Substituting for $C_{m,n}$ from equation 3, setting m=n, and solving for the ratio of the spectrum required for intra-communication within the groups ωφ to the total spectrum S, we obtain:

$$\frac{\omega\phi}{S} = 1/1 + \alpha \qquad \text{Equation 8}$$

where $$\alpha = 1 \bigg/ \left(1 + \frac{m}{F}\right)m(m-1) \cdot \log_2(k \cdot SNR_{1,1}) \cdot \frac{W\phi}{S} \qquad \text{Equation 9}$$

The relative capacity for a distributed system with m=n thus becomes $$C_{m,n}/C_{1,1} = m\left(1 - \frac{1}{1+\alpha}\right) \qquad \text{Equation 10}$$

$$C_{m,n}/C_{1,1} = m\left(\frac{1}{1 + \left(1 + \frac{m}{F}\right)m(m-1) \cdot \log_2(k \cdot SNR_{1,1}) \cdot \frac{W\phi}{S}}\right) \qquad \text{Equation 11}$$

From equation 11 we can see that a narrowband signal (W), a large spectral allocation (S) and a low frequency re-use factor (φ) are key enablers of high spectral efficiency in a distributed receiver system.

This is represented graphically in FIG. 6, which represents a system with a 10 kHz, data channel to each terminal and other parameters as shown in the table below.

| Line | F | κ | SNR | W | φ | S |
|---|---|---|---|---|---|---|
| 61 | 100 | 10 | 10 | 10 | 4 | 1250 |
| 62 | 100 | 10 | 10 | 10 | 4 | 5000 |
| 63 | 1000 | 10 | 10 | 10 | 4 | 5000 |
| 64 | 1000 | 4 | 10 | 10 | 4 | 5000 |
| 65 | 1000 | 4 | 5 | 10 | 4 | 5000 |
| 66 | 1000 | 4 | 5 | 10 | 1 | 5000 |
| 67 | Equivalent performance for a standard MIMO (Multiple Input Multiple Output) system | | | | | |

Figure 6:
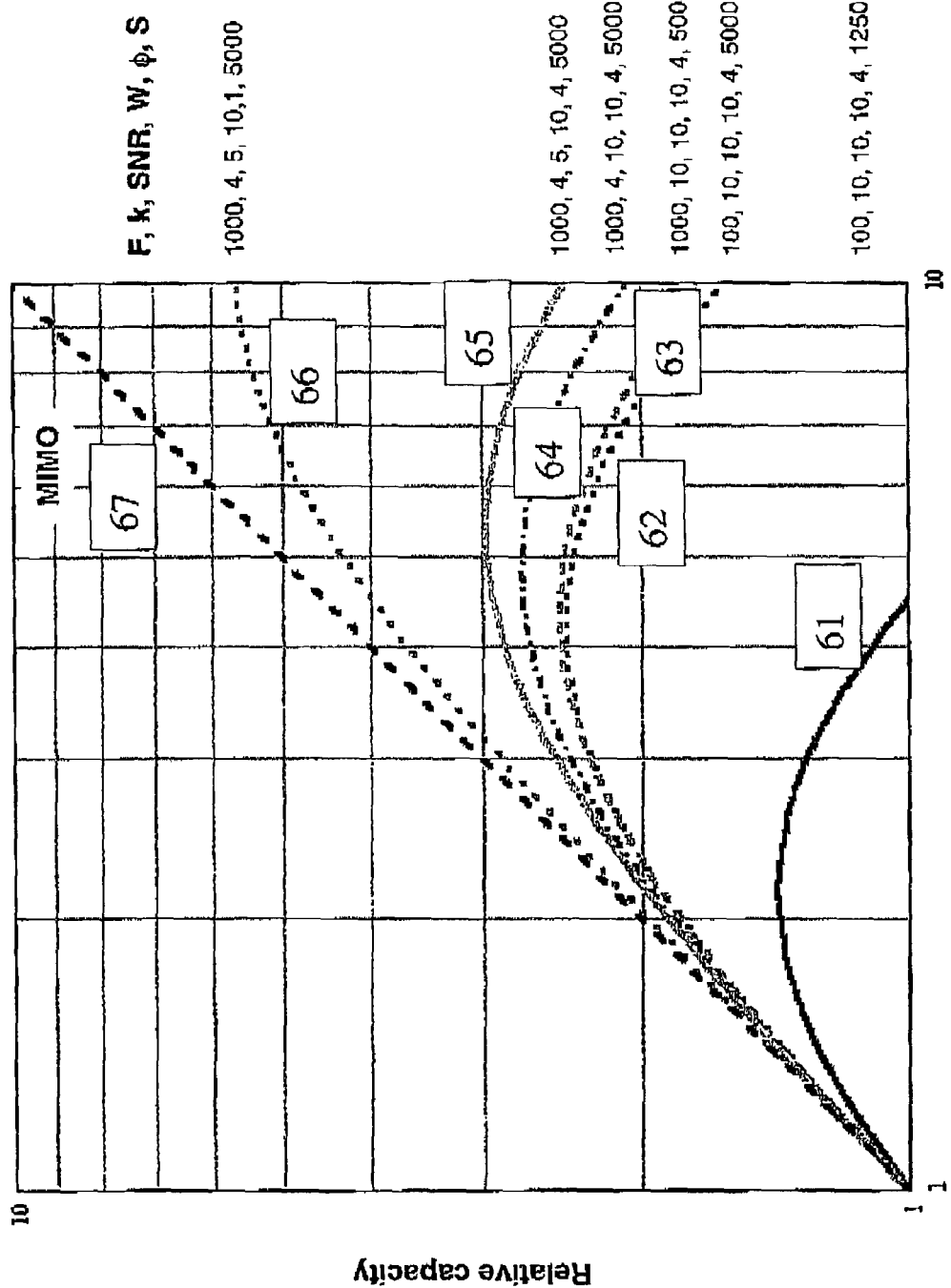
FIG. 6 illustrates graphically a first example of the form of the spectral efficiency improvement that may be obtained by the system of FIG. 1.

FIG. 6 shows that the overall capacity gain is relatively insensitive to the frame size (F) and the signal to noise ratio (SNR) and is dominated by the frequency re-use (φ) and spectral allocation (S). At the peak capacity gain of between 2 and 3, approximately 50% of the overall spectrum of for example 5 MHz is required for communication within the terminal groups, for which purpose WLANs of nearly 1 MHz bandwidth are required. The system is therefore suited to low data-rate terminals, and an efficient ad-hoc network protocol will be required to form spectrally efficient terminal groups.

It will be apparent to those skilled in the art that the method followed in the example above can be readily adapted to similarly determine the proportion of spectrum that must be set aside for intra-cell communication (where this is communication within the micro-cell) in the other cases, for example where analogue means are employed for intra-cell communication, or where the transmitter or the transmitter and the receiver are distributed in the micro-cell, or where some or all of the cooperating terminals are idle, rather than actively engaged in their own sessions. Indeed, advantage can be obtained in terms of a reduced intra-cell communication requirement if the cooperating terminals are otherwise idle, provided that there are sufficient of them in close proximity to the first mobile terminal. Examples of such cases can be found in appendix 1.

The optimum number of user terminals required to form a group represents a trade-off between the advantages of spatial processing gain and statistical multiplexing gain derived from a multiplicity of users and the bandwidth requirement for the exchange of information between the members of the group or micro-cell, depending on the circumstances. This will be determined by the system user such that the gain in spectral efficiency is close to the maximum value, such as that indicated in the FIGS. 6-11, which illustrate graphically the relationship between spectral efficiency and the number of terminals in a group. In addition, the spectral efficiency gain can be enhanced by control of the amount of processing that is performed in the first processing step. Ideally, the terminals should exchange as much information as possible to facilitate the second processing step to recover the signal. However, the bandwidth required for this information exchange is part of the overall spectrum resource, and therefore a choice should be made to balance the demands of information exchange against the total bandwidth budget.

Spatial processing gain increases with the number of antennas at each end of the link. However, the amount of spectrum required for communication between the cooperating terminals also increases with the number of terminals. An optimum occurs when the number of terminals in the group forming the micro-cell is large enough to provide significant spatial processing gain but is not so large that the overall system capacity is degraded by the amount of spectrum required for communication between the terminals.

Furthermore, it is important to have a tight frequency re-use pattern amongst the micro-cells. Adding a further mobile terminal to a micro-cell may be counterproductive if it results in an increase in the frequency re-use factor for the micro-cellular ad-hoc network, for example due to anomalous propagation conditions.

Not all terminals contribute to the trade-off between spatial processing gain and spectrum required for communication between terminals in the same way.

Propagation effects such as shadowing can lead to a terminal seeing a relatively low signal power and hence being unable to make a significant contribution to the final combined signal power. Variation in propagation conditions between antenna elements is more likely when they are disposed on different terminals than it is in a conventional MIMO (multiple input multiple output) system (i.e. one having multiple antennas at both the transmitter and at the receiver) in which the antenna elements are collocated on the same terminal.

The amount of spectrum required for communication between cooperating terminals depends upon whether the terminals are actively engaged in their own sessions or are idle. Active terminals require more spectrum than idle terminals and hence the optimum number required to form a micro-cell is lower.

When selecting terminals for inclusion in a micro-cell it is important both that the terminals within the micro-cell can communicate well (i.e. good quality link) with each other and that each of the terminals can communicate well with the base station.

The criteria for selecting terminals for inclusion in a micro-cell can be summarised as follows:
  Contribution to the spatial processing gain
  Terminal activity (active or idle terminal)
  Channel bandwidth
  Effect on the micro-cellular frequency re-use factor
  Total spectral allocation Two preferred techniques for determining which terminals should be selected for inclusion in a micro-cell are described below. It will be understood by those skilled in the art that there are other possible techniques which could be used.

In the first technique, it is assumed that the channel bandwidth W, the overall spectral allocation S, the intra-cell frequency allocation $\omega$ and the micro-cell frequency re-use $\phi$ are known to the terminal, either pre-set or supplied by the network management system (NMS). The principles of the algorithm can be illustrated by considering the downlink example used above in which a base station with multiple antennas is transmitting to a first mobile terminal, which is in a micro-cell with other similar terminals. It is assumed that the number of transmit antennas is known, as is the required signal to noise ratio for the base station to mobile link and the mobile terminal to mobile terminal links. The last of these three parameters is required because a terminal, in deciding which other terminals should be within a micro-cell needs to ensure that it can communicate sufficiently well with the other terminals within the micro-cell (as in stage 1 below).

The first mobile terminal seeks other mobile terminals according to the following algorithm:

1. Determine that the signal to noise ratio between cooperating terminal and the first mobile terminal can be met for intra-micro-cell communication within the constraints of the micro-cellular frequency re-use $\phi$. The necessary information may be available from the physical layer of the ad-hoc network protocol performing the inter-terminal (i.e. intra-micro-cell) communication: for example, the mobile terminals could monitor received signal strength (RSSI) or bit error ratio (BER) on the link.

2. Select idle terminals in preference to active terminals. Idle terminals are preferred to active terminals because their intra-micro-cell communication requirements are lower but there may not be enough idle terminals or the micro-cellular re-use condition may mean that some idle terminals cannot be used. For example, interference between micro-cells, due to anomalous propagation, may prevent a micro-cell from being fully populated with idle terminals while maintaining the necessary signal to noise ratio and frequency re-use factor. Hence, it may sometimes be advantageous to make use of active terminals that are located in the vicinity of the first mobile terminal.

3. Maximise the spatial processing gain by increasing the number of cooperating terminals and selecting terminals that make the greatest contribution to the overall combined signal power. In this step, it is the quality of the base station to terminal link which is important. Algorithms for doing this based on the characteristics of the combined signal, such as an error check, final BER, or eigenvalue of the MIMO signal, have been described by Smith et al in U.S. patent application Ser. Nos. 10/083,094 and 10/083,100. However, such techniques as they describe, which rely on the combined signal, may not be appropriate here because of the increased load they place on the intra-micro-cell communication, due to the need to provide signals from all of the mobile terminals in the vicinity of the first mobile terminal. An alternative measure, such as RSSI, is preferred because this can be performed at each mobile terminal without communication between terminals and the terminal can be selected or not for inclusion in the micro-cell of the first mobile terminal based on a local measurement of this parameter.

In the second preferred technique, it is assumed that in practice it is likely that the total spectrum S and the spectrum $\omega$ allocated to inter-terminal communication will be fixed. From these values and the channel bandwidth W, an estimate of the optimum number of antennas can be pre-determined, for example by solving equation 11. The choice of $\omega$ will have been made assuming a frequency re-use factor that the ad-hoc network is capable of meeting at the required signal to noise ratio. Hence the only variable is to choose which of the terminals in the vicinity are to be included in the cooperating group. In the first instance, the cooperating group should be chosen from idle terminals. Active terminals should only be included if there are insufficient idle terminals. The group should be expanded until ω is fully utilised. A search should be continually made for a terminal with a better RSSI than the lowest in the group, and if one is found it should replace the one with the worst RSSI in the micro-cell, particularly if the one with the better RSSI is an idle terminal.

It will be understood that the above description of a preferred embodiment is given by way of example only and that various modifications may be made by those skilled in the art without departing from the spirit and scope of the invention.

APPENDIX 1

Example 2

The transmitter is distributed, so that several terminals, each equipped with a single antenna, cooperate to enhance the signal transmitted to a multi-antenna base station. In this scenario, additional spectrum is required for communication between the cooperating terminals. The other terminals in the micro-cell are assumed to be similarly engaged in their own sessions, in addition to the signals required to be received and transmitted in respect of the first mobile terminal. Intra-cell communication is assumed to be digital.

For each bit of a signal from transmitter T to receiver R, 1/m space-time symbols are transmitted. The relevant component of each of these space-time symbols must be passed from transmitter T to each of the m−1 other cooperating terminals in the group. These components are hard, rather than soft, symbols and so are encoded as {1, −1}, or one bit per symbol. Therefore, the total number of bits that must be transmitted by transmitter T to the (m−1) transmitters corresponding to the signal intended for receiver R is $$\frac{m-1}{m} \cdot C_{m,n} \qquad \text{Equation 13}$$

If we assume an open loop system, there is no need for the transmitter T to estimate the channels and so channel data need not be distributed among the cooperating group and so equation 13 represents the total number of bits that must be transmitted by transmitter T to the (m−1) transmitters corresponding to the signal intended for receiver R.

We can substitute this into Shannon's formula and solve for the ratio ωφ/S as follows:

$$\frac{m-1}{m} \cdot C_{m,n} = \frac{\omega}{m} \cdot \log_2(1 + SNR_{1,1}) \qquad \text{Equation 14}$$

Note the factor 1/m on the RHS of equation 14, which arises because ω represents the total available spectrum for intra-communication within the group for all m signals transmitted by the group. Recalling that we have set m=n, the proportion required for the signal from transmitter T is therefore ω/m.

Again, there is an implicit assumption here that the transmitter T cooperates with other terminals engaged in their own sessions and not with idle terminals. If the latter is the case, then the factor 1/m does not apply.

Substituting for $C_{m,n}$ from equation 3, setting m=n, and solving for the ratio of the spectrum required for intra-communication within the groups ωφ to the total spectrum S, we obtain:

$$\frac{\omega \phi}{S} = \frac{1}{1+\alpha} \qquad \text{Equation 15}$$

where $$\alpha = 1/m(m-1) \cdot \frac{W \phi}{S} \qquad \text{Equation 16}$$

The relative capacity for a distributed system with m=n thus becomes $$\frac{C_{m,n}}{C_{1,1}} = m\left(1 - \frac{1}{1+\alpha}\right) \qquad \text{Equation 17}$$

$$\frac{C_{m,n}}{C_{1,1}} = m\left(\frac{1}{1 + m(m-1) \cdot \frac{W\phi}{S}}\right) \qquad \text{Equation 18}$$

From equation 18 we can see that a narrowband signal, a large spectral allocation and a low frequency re-use factor are key enablers of high spectral efficiency in a distributed MIMO system. This is reflected in FIG. 7, which shows that the overall capacity gain is dominated by the frequency re-use and spectral allocation.

| Line | W | φ | S |
|---|---|---|---|
| 71 | 10 | 4 | 1250 |
| 72 | 10 | 4 | 5000 |
| 73 | 10 | 1 | 5000 |
| 74 | Equivalent performance for a standard MIMO (Multiple Input Multiple Output) system | | |

Figure 7:
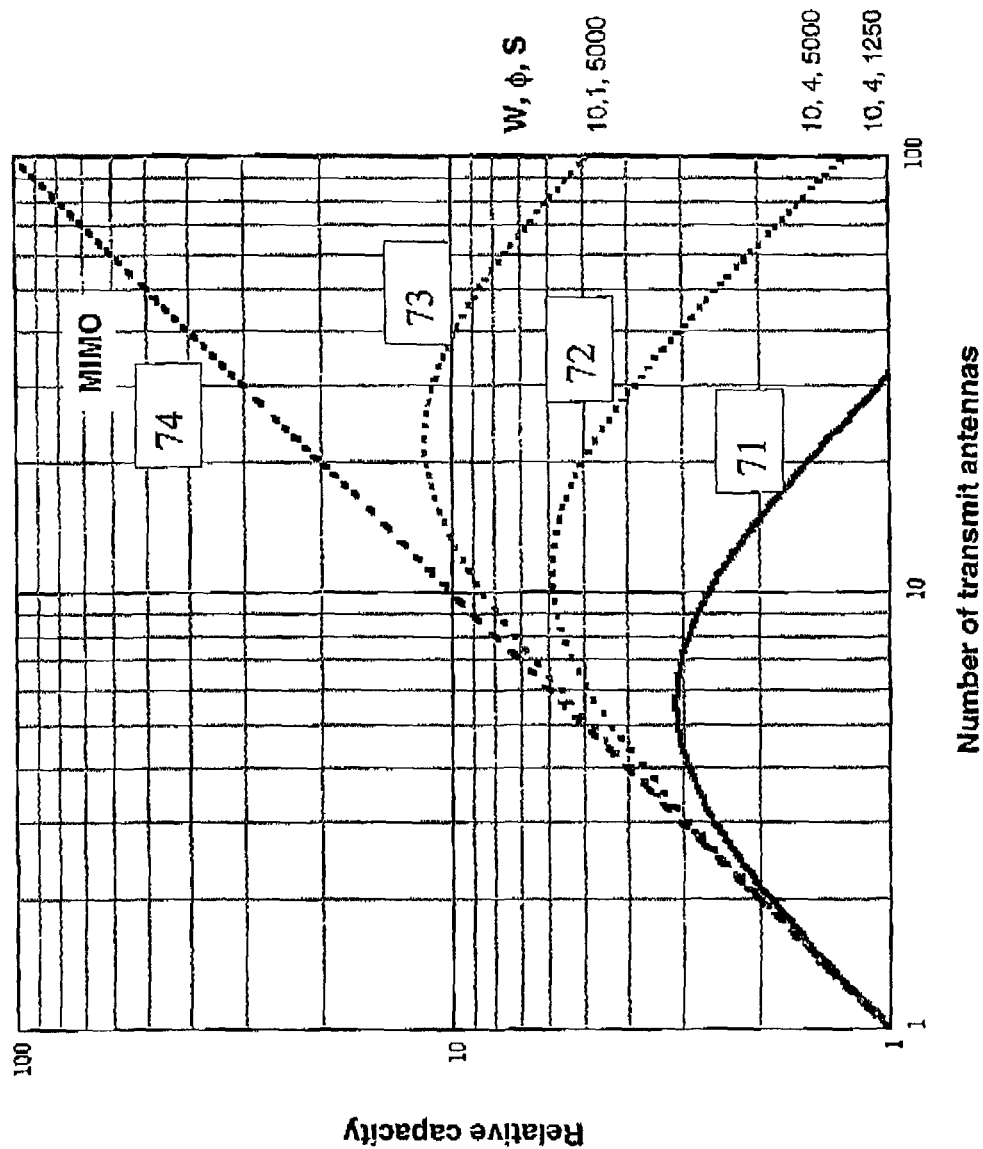
FIG. 7 illustrates graphically a second example of the form of the spectral efficiency improvement that may be obtained by the system of FIG. 1.

Typical values shown in FIG. 7 represent a system with a 10 kHz data channel to each terminal and other parameters as shown in the table above. At the peak capacity gain of approximately 6, roughly 50% of the overall spectrum of 5 MHz is required for communication within the terminal groups, for which purpose WLANs of nearly 1 MHz bandwidth are required. As in the case where the receiver is distributed, the system is suited to low data-rate terminals, and an efficient ad-hoc network protocol will be required to form spectrally efficient terminal groups. It is interesting to note, however, that the optimum number of terminals forming the micro-cell is different in the two cases and there is an apparent asymmetry between the uplink and downlink in a distributed MIMO system.

Example 3

Both the transmit and the receive ends of the link are distributed, consisting of groups of cooperating terminals, in which each terminal is equipped with a single antenna. In this scenario, additional spectrum is required for communication between the cooperating terminals at both the transmitter and the receiver.

In this case, the proportion of the total spectrum required at the receive end of the link for intra-group communication is given by equations 8 and 9. At the transmit end, the corresponding proportion of the spectrum is described by equations 15 and 16. The total proportion of the spectrum that must be set aside for communication within the transmit terminal group and within the receive terminal group is the sum of the respective amounts, leading to $$\frac{\omega_{Rx}\phi}{S} + \frac{\omega_{Tx}\phi}{S} = \frac{1}{1+\alpha_{Rx}} + \frac{1}{1+\alpha_{Tx}} \qquad \text{Equation 19}$$

where $$\alpha_{Rx} = 1 \bigg/ \left(1 + \frac{m}{F}\right) m(m-1) \cdot \log_2(k \cdot SNR_{1,1}) \cdot \frac{W\phi}{S} \qquad \text{Equation 20}$$

and $$\alpha_{Tx} = 1/m(m-1) \cdot \frac{W\phi}{S} \qquad \text{Equation 21}$$

Hence, the capacity gain that obtains is given by $$\frac{C_{m,n}}{C_{1,1}} = m\left(1 - \frac{1}{1+\alpha_{Rx}} \frac{1}{1+\alpha_{Tx}}\right) \qquad \text{Equation 22}$$

Figure 8:
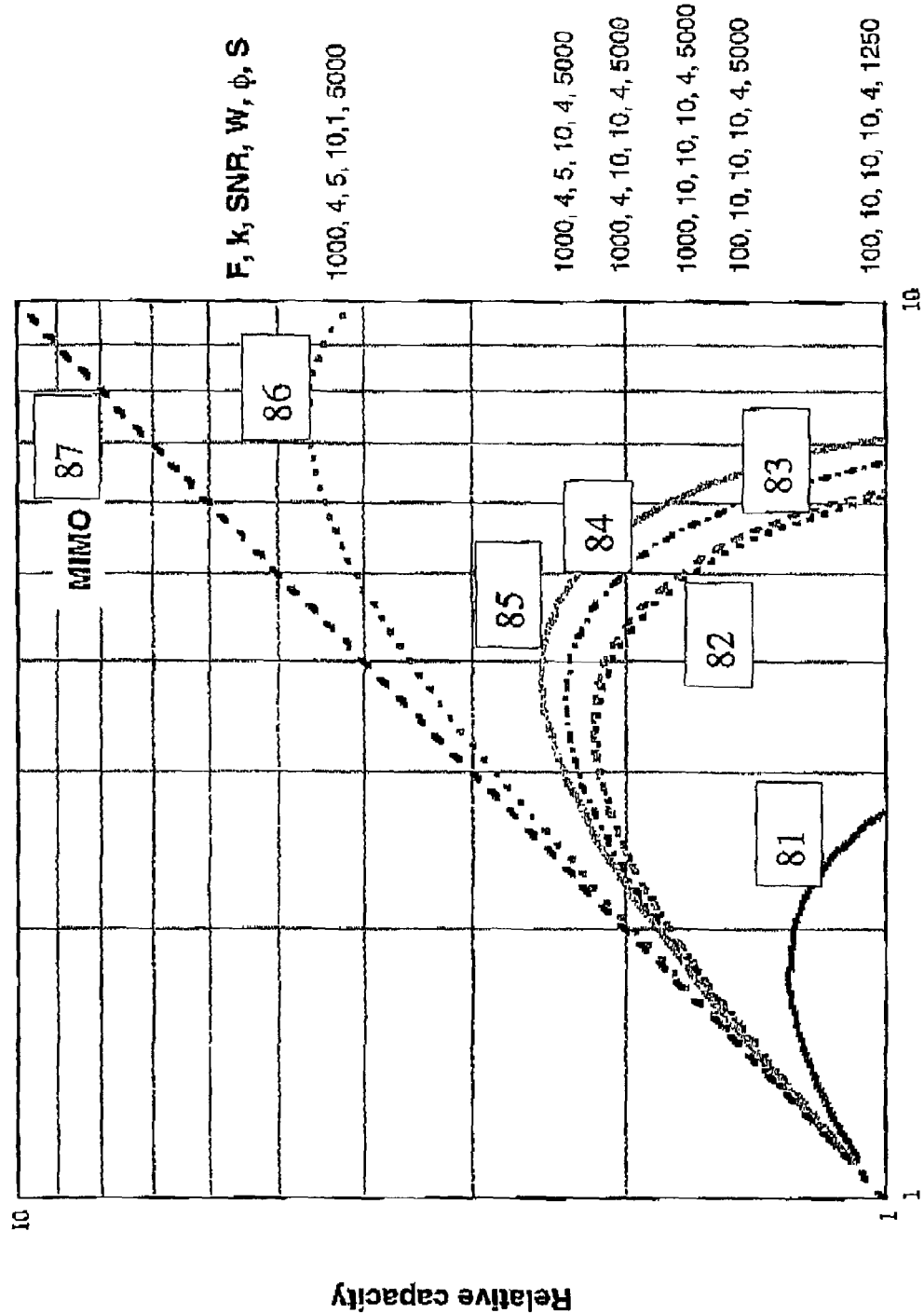
FIG. 8 illustrates graphically a third example of the form of the spectral efficiency improvement that may be obtained by the system of FIG. 1.

This is shown in FIG. 8, which shows that the overall capacity gain is again dominated by the frequency re-use and spectral allocation.

| Line | F | κ | SNR | W | φ | S |
|------|------|----|-----|----|---|------|
| 81 | 100 | 10 | 10 | 10 | 4 | 1250 |
| 82 | 100 | 10 | 10 | 10 | 4 | 5000 |
| 83 | 1000 | 10 | 10 | 10 | 4 | 5000 |
| 84 | 1000 | 4 | 10 | 10 | 4 | 5000 |
| 85 | 1000 | 4 | 5 | 10 | 4 | 5000 |
| 86 | 1000 | 4 | 5 | 10 | 1 | 5000 |
| 87 | Equivalent performance for a standard MIMO (Multiple Input Multiple Output0 system | | | | | |

Typical values shown in FIG. 8 represent a system with a 10 kHz data channel to each terminal and other parameters as shown in the table above. At the peak capacity gain of between 2 and 3, approximately 50% of the overall spectrum of 5 MHz is required for communication within the terminal groups, for which purpose WLANs of nearly 1 MHz bandwidth are required. The system is therefore suited to low data-rate terminals, and an efficient ad-hoc network protocol will be required to form spectrally efficient terminal groups. The performance of this system with both distributed transmitter and distributed receiver is more closely matched to that of the system with distributed receiver only and so we may infer that distribution of the data among the receive terminals dominates the behaviour.

Up to this point we have made the assumption that all of the cooperating terminals, whether transmitters or receivers, are active in their own sessions. The micro-cells are therefore formed of groups of active terminals. This requires each terminal to operate multiple sessions simultaneously and therefore requires additional signal processing within the terminal. The advantage is that statistical multiplexing gain may be possible between the sessions.

We now consider the case in which the receiver R or transmitter T is the only terminal actively engaged in a session and that other members of the cooperating group are otherwise idle. No additional signal processing is required in the terminals in this case, as each terminal is only required to handle a single session. However, statistical multiplexing gain may not result from this arrangement.

Example 4

Distributed Receiver

We noted above that if cooperation is with idle terminals, rather than those engaged in their own sessions, the factor 1/n in equation 5 and the factor 1/m on the RHS of equation 7, do not apply. Although the total spectrum available for intra-terminal communication is given by $$\frac{\omega\phi}{S} = \frac{1}{1+\alpha} \qquad \text{Equation 23}$$

as before, the definition of α changes and equation 9 becomes $$\alpha = 1 \bigg/ \left(1 + \frac{m^2}{F}\right)(m-1) \cdot \log_2(k \cdot SNR_{1,1}) \cdot \frac{W\phi}{S} \qquad \text{Equation 24}$$

The relative capacity for a distributed system with m=n, then becomes $$\frac{C_{m,n}}{C_{1,1}} = m\left(1 - \frac{1}{1+\alpha}\right) \qquad \text{Equation 25}$$

$$\frac{C_{m,n}}{C_{1,1}} = m\left(\frac{1}{1 + \left(1 + \frac{m^2}{F}\right)(m-1) \cdot \log_2(k \cdot SNR_{1,1}) \cdot \frac{W\phi}{S}}\right) \qquad \text{Equation 26}$$

Figure 9:
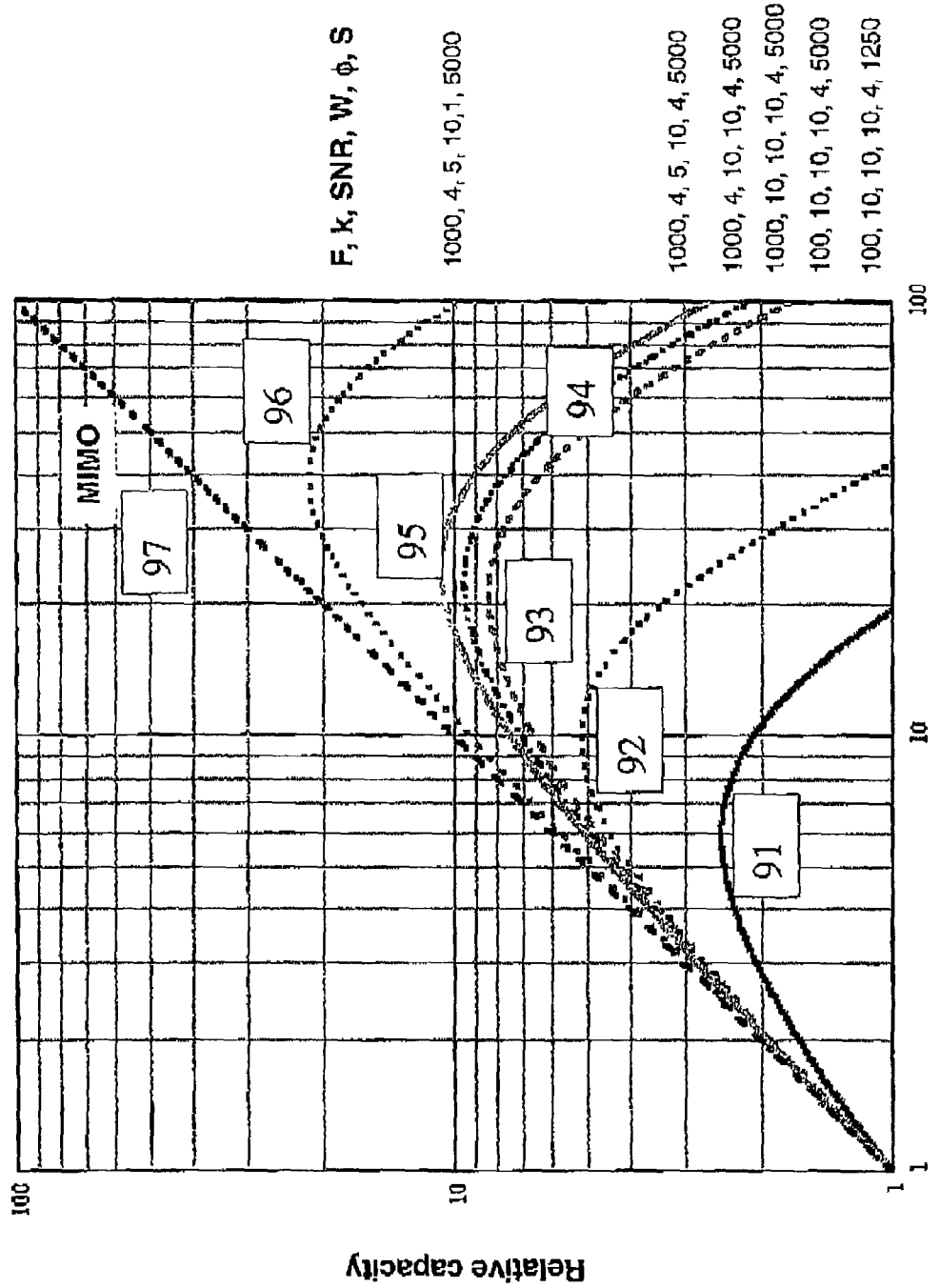
FIG. 9 illustrates graphically a fourth example of the form of the spectral efficiency improvement that may be obtained by the system of FIG. 1.

The performance is shown in FIG. 9, which shows that the overall capacity gain is still dominated by the frequency re-use and spectral allocation, wherein:

| Line | F | κ | SNR | W | φ | S |
|------|------|----|-----|----|---|------|
| 91 | 100 | 10 | 10 | 10 | 4 | 1250 |
| 92 | 100 | 10 | 10 | 10 | 4 | 5000 |
| 93 | 1000 | 10 | 10 | 10 | 4 | 5000 |
| 94 | 1000 | 4 | 10 | 10 | 4 | 5000 |
| 95 | 1000 | 4 | 5 | 10 | 4 | 5000 |
| 96 | 1000 | 4 | 5 | 10 | 1 | 5000 |
| 97 | Equivalent performance for a standard MIMO (Multiple Input Multiple Output0 system | | | | | |

Typical values shown in FIG. 9 represent a system with a 10 kHz data channel to each terminal and other parameters as shown in the table above. At the peak capacity gain of between 8 and 10, approximately 50% of the overall spectrum of 5 MHz is required for communication within the terminal groups, for which purpose WLANs of nearly 1 MHz bandwidth are required. The system is therefore suited to low data-rate terminals, and an efficient ad-hoc network protocol will be required to form spectrally efficient terminal groups. It is interesting to note that the gain achievable is significantly higher when cooperation is with idle cells and that the optimum number of cooperating terminals is also correspondingly increased.

Example 5

Distributed Transmitter

We noted above that if cooperation is with idle terminals, rather than those engaged in their own sessions, the factor 1/n on the RHS of equation 14 does not apply. The total spectrum available for intra-terminal communication is given by $$\frac{\omega\phi}{S} = \frac{1}{1+\alpha} \qquad \text{Equation 27}$$

as before but the definition of α changes and equation 16 becomes $$\alpha = 1/(m-1) \cdot \frac{W\phi}{S} \qquad \text{Equation 28}$$

The relative capacity for a distributed system with m=n, thus becomes $$\frac{C_{m,n}}{C_{1,1}} = m\left(1 - \frac{1}{1+\alpha}\right) \qquad \text{Equation 29}$$

$$\frac{C_{m,n}}{C_{1,1}} = m\left(\frac{1}{1+(m-1)\cdot\frac{W\phi}{S}}\right) \qquad \text{Equation 30}$$

Figure 10:
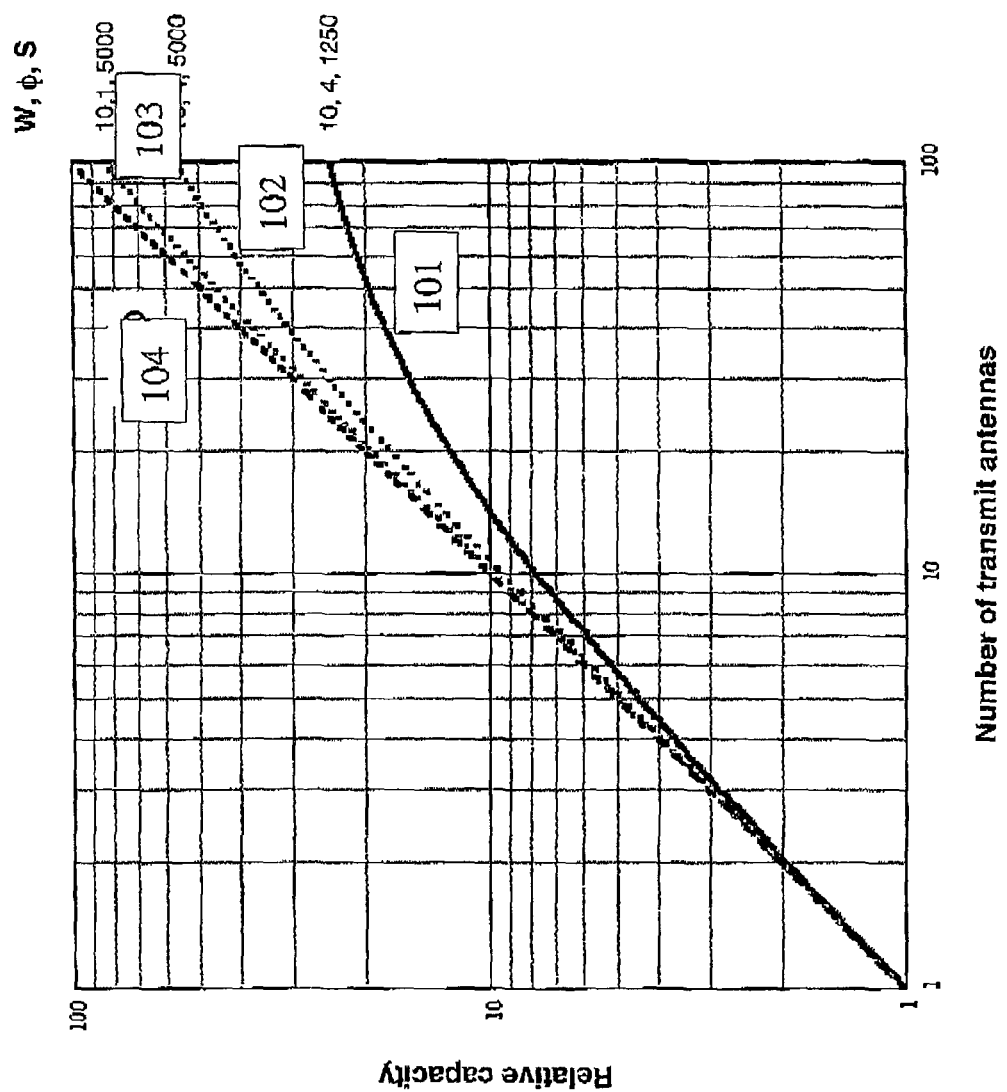
FIG. 10 illustrates graphically a fifth example of the form of the spectral efficiency improvement that may be obtained by the system of FIG. 1.

The performance is shown in FIG. 10, which shows that the overall capacity dominated by the frequency re-use and spectral allocation, wherein:

| Line | W | φ | S |
|---|---|---|---|
| 101 | 10 | 4 | 1250 |
| 102 | 10 | 4 | 5000 |
| 103 | 10 | 1 | 5000 |
| 104 | Equivalent performance for a standard MIMO (Multiple Input Multiple Output0 system | | |

Typical values shown in FIG. 10 represent a system with a 10 kHz data channel to each terminal and other parameters as shown in the table above. The peak capacity gain is not achieved within a reasonable number of cooperating terminals, the gain achievable being significantly higher when cooperation is with idle cells and the optimum number of cooperating terminals being correspondingly greater. It therefore appears possible that a distributed MIMO uplink may be implemented with relatively low intra-terminal traffic in comparison to the gain achieved. There is therefore an apparent asymmetry between the uplink and downlink in a distributed MIMO system that is exaggerated when cooperation is with idle terminals. This asymmetry could be exploited, for example, to enable higher data rates on the uplink than on the downlink, as reasonable gains can be achieved on the uplink with a 100 kHz channel, rather than the 10 kHz channel we have typically used as an example on the downlink.

Example 6

Both the transmit and the receive ends of the link are distributed, consisting of groups of cooperating terminals, each equipped with a single antenna. In this scenario, additional spectrum is required for communication between the cooperating terminals at both the transmitter and the receiver.

In this case, the proportion of the total spectrum required at the receive end of the link for intra-group communication is given by equations 23 and 24. At the transmit end, the corresponding proportion of the spectrum is described by equation 27 and 28. The total amount of spectrum that must be set aside for communication within the transmit terminal group and within the receive terminal group is the sum of the respective amounts, leading to $$\frac{\omega_{Rx}\phi}{S} + \frac{\omega_{Tx}\phi}{S} = \frac{1}{1+\alpha_{Rx}} + \frac{1}{1+\alpha_{Tx}} \qquad \text{Equation 31}$$

where $$\alpha_{Rx} = 1\bigg/\left(1 + \frac{m^2}{F}\right)(m-1)\cdot\log_2(k\cdot SNR_{1,1})\cdot\frac{W\phi}{S} \qquad \text{Equation 32}$$

and $$\alpha_{Tx} = 1/(m-1)\cdot\frac{W\phi}{S} \qquad \text{Equation 33}$$

Hence, $$\frac{C_{m,n}}{C_{1,1}} = m\left(1 - \frac{1}{1+\alpha_{Rx}} - \frac{1}{1+\alpha_{Tx}}\right) \qquad \text{Equation 34}$$

The performance is shown in FIG. 11, which shows that the overall capacity gain is dominated by the frequency re-use and spectral allocation, wherein:

| Line | F | κ | SNR | W | φ | S |
|---|---|---|---|---|---|---|
| 111 | 100 | 10 | 10 | 10 | 4 | 1250 |
| 112 | 100 | 10 | 10 | 10 | 4 | 5000 |
| 113 | 1000 | 10 | 10 | 10 | 4 | 5000 |
| 114 | 1000 | 4 | 10 | 10 | 4 | 5000 |
| 115 | 1000 | 4 | 5 | 10 | 4 | 5000 |
| 116 | 1000 | 4 | 5 | 10 | 1 | 5000 |
| 117 | Equivalent performance for a standard MIMO (Multiple Input Multiple Output) system | | | | | |

Typical values shown in FIG. 11 represent a system with a 10 kHz data channel terminal and other parameters as shown in the table above. At the peak capacity gain of between 7 and 9, approximately 50% of the overall spectrum of 5 kHz is required for communication within the terminal groups, for which purpose WLANs of nearly 1 MHz bandwidth are required. The system is therefore suited to low data-rate terminals, and an efficient ad-hoc network protocal will be required to form spectrally efficient terminal groups. The performance of this system with both distributed transmitter and distributed receiver is more closely matched to that of the system with distributed receiver only and so we may infer that distribution of the data among the receive terminals dominates the behaviour.

The invention claimed is:

1. A mobile communications system in which communication with a plurality of mobile terminals is provided by a base station, wherein said terminals are adapted each to communicate with one or more adjacent similar terminals to establish ad-hoc groups of terminals, each said group functioning cooperatively as a micro-cell for communications purposes, wherein each terminal in a said group is arranged to perform a first processing step on signals received from the base station, to exchange directly with the other terminals of the group transmission related signal information derived from said first processing step, and to perform a second spatial processing step utilizing exchanged transmission related signal information received from other terminals of the group so as to derive, from the received signals, a signal intended for reception by that terminal, and wherein the number of terminals within a said group maximizes the spectral efficiency of the system.

2. A mobile communications system as claimed in claim 1, wherein the amount of processing that is performed in the first processing step is controlled so as to enhance the spectral efficiency gain.

3. A mobile communications system as claimed in claim 2, wherein the base station is arranged to transmit simultaneously a plurality of signals one for each mobile terminal of the group.

4. A mobile communications system as claimed in claim 3, wherein each said transmitted signal is encoded with a respective unique spreading sequence.

5. A mobile communications system as claimed in claim 4, wherein each said spreading sequence comprises a Walsh code.

6. A mobile communications system as claimed in claim 5, and comprising a code division multiple access (CDMA) system.

7. A method of providing spectrum re-use in a mobile communications system in which communication with a plurality of mobile terminals is provided by a base station, and wherein said terminals are adapted each to communicate with one or more adjacent similar terminals to establish ad-hoc groups of terminals, each said group functioning co-operatively as a micro-cell for communications purposes, the method comprising: transmitting signals from the base station to all terminals of the group; at each terminal of said group, performing a first processing step on signals received from the base station; exchanging directly with the other terminals of the group transmission related signal information derived from said first processing step, and performing a second spatial processing step utilizing exchanged transmission related signal information received from other terminals of the group so as to derive, from the received signals, a signal intended for reception by that terminal, and wherein the number of terminals within a said group is selected to maximize the spectral efficiency of the system.

8. A method as claimed in claim 7, wherein the amount of processing that is performed in the first processing step is controlled so as to enhance the spectral efficiency gain.

9. A method as claimed in claim 8, wherein the base station transmits simultaneously a plurality of signals one for each mobile terminal of the group.

10. A method as claimed in claim 9, wherein each said transmitted signal is encoded with a respective unique spreading sequence.

11. A method as claimed in claim 10, wherein each said spreading sequence comprises a Walsh code.

12. A method as claimed in claim 11, wherein said system comprises a code division multiple access (CDMA) system.

13. A method as claimed in claim 7 and embodied as software in machine-readable form on a non-transitory carrier medium.

14. A method of providing spectrum re-use in a mobile communications system in which a plurality of mobile terminals communicate with one another in a peer to peer manner, and wherein said terminals are adapted each to communicate with one or more adjacent similar terminals to establish ad-hoc groups of terminals, each said group functioning co-operatively as a micro-cell for communications purposes, the method comprising: receiving signals at all terminals of the group; at each terminal of said group, performing a first processing step on the received signals; exchanging directly with the other terminals of the group transmission related signal information derived from said first processing step, and performing a second spatial processing step utilizing exchanged transmission related signal information received from other terminals of the group so as to derive, from the received signals, a signal intended for reception by that terminal, and wherein the number of terminals within a said group is selected such as to maximize the spectral efficiency of the system.

15. A mobile terminal for use in a mobile communications system in which communication with a plurality of similar mobile terminals is provided by a base station, wherein said terminal is adapted to communicate with one or more adjacent similar terminals to establish an ad-hoc group of terminals functioning co-operatively as a micro-cell for communications purposes, and wherein said terminal is arranged to perform a first processing step on signals received from the base station, to exchange directly with the other terminals of the group transmission related signal information derived from said first processing step, and to perform a second spatial processing step utilizing exchanged transmission related signal information received from other terminals of the group so as to derive, from the received signals, a signal intended for reception by that terminal.

16. A mobile communications system as claimed in claim 1 wherein terminals are selected to form part of said group by monitoring the strength of a received signal from the base station and selecting terminals with the highest received signal strength.

17. A method of providing spectrum re-use as claimed in claim 7 wherein terminals are selected to form part of said group by monitoring the strength of a received signal from the base station and selecting terminals with the highest received signal strength.

18. A mobile terminal as claimed in claim 15 wherein said terminal selects which adjacent similar terminals will co-operate as a micro-cell by receiving signals from adjacent terminals, wherein each terminal monitors the strength of the signal it receives from the base station, and selects terminals with the highest received signal strength.

* * * * *